Dec. 31, 1940.   W. H. THOMAS   2,226,597
REFLECTOR STRUCTURE
Filed Sept. 17, 1938   2 Sheets-Sheet 1
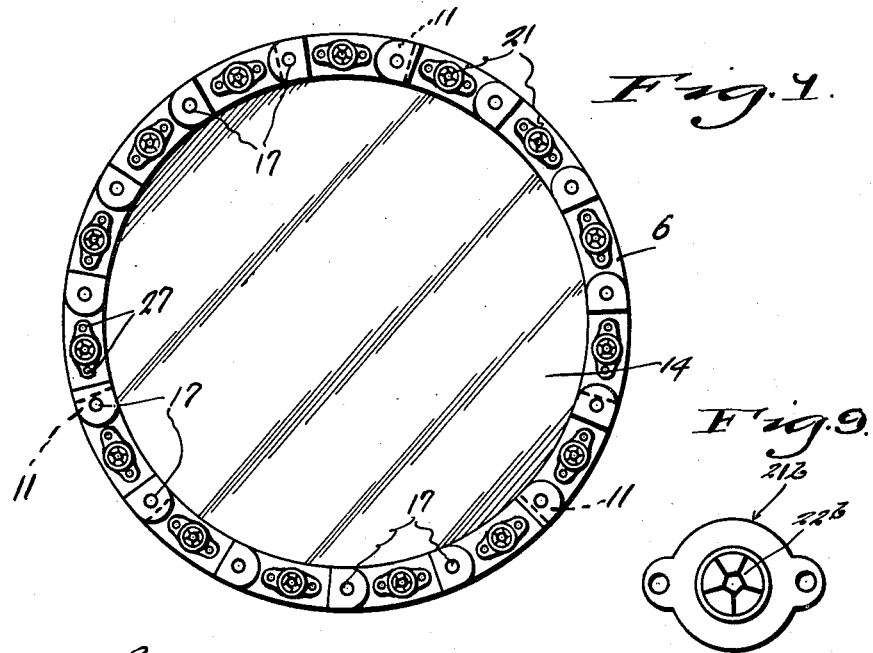
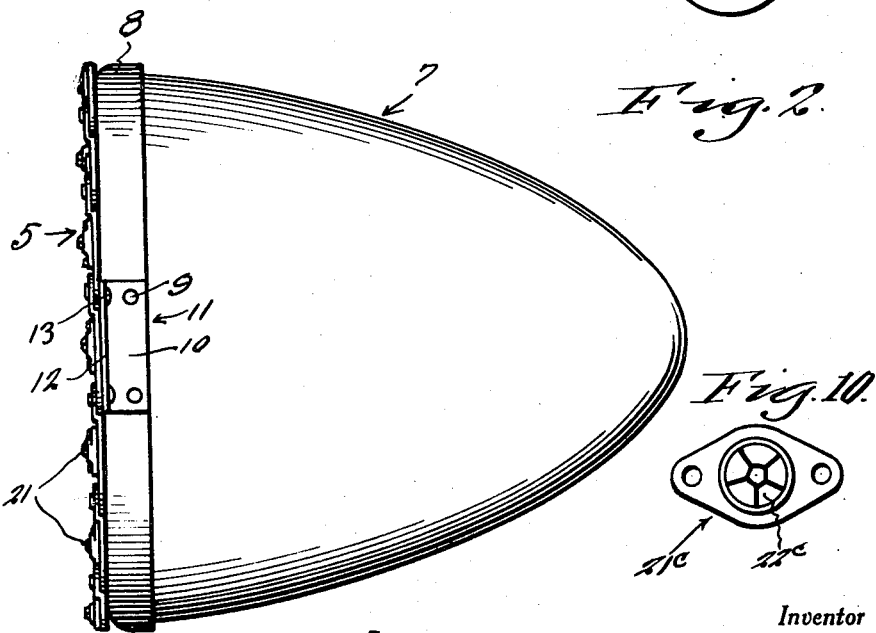
Inventor
William H. Thomas
By Clarence A. O'Brien
and Hyman Berman
Attorneys Dec. 31, 1940.  W. H. THOMAS  2,226,597
REFLECTOR STRUCTURE
Filed Sept. 17, 1938  2 Sheets-Sheet 2
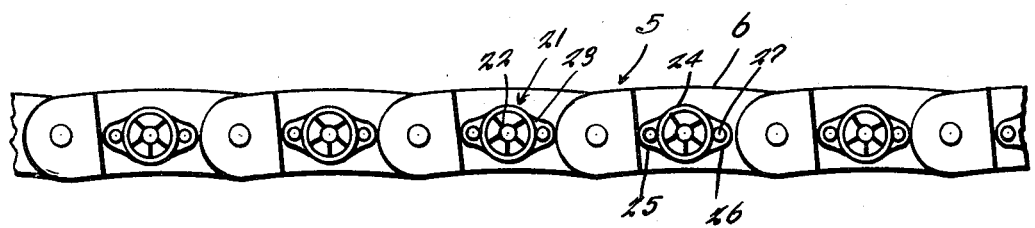
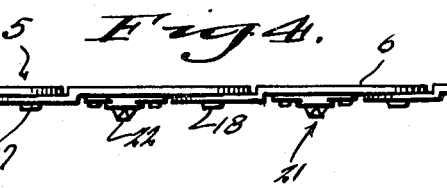
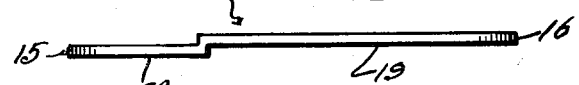
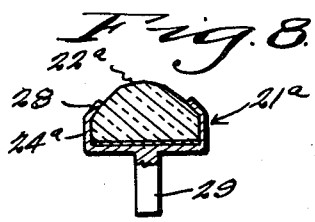
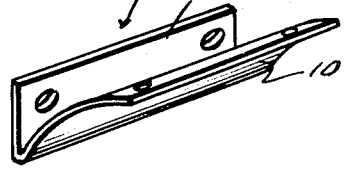
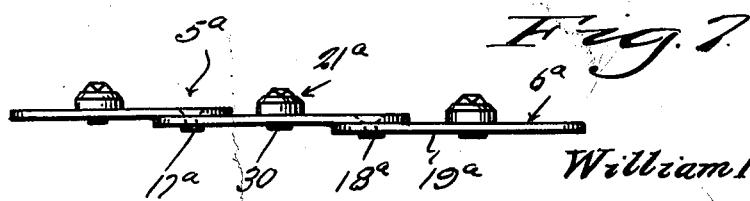
Inventor
William H. Thomas
By Clarence A. O'Brien
and Hyman Berman
Attorneys Patented Dec. 31, 1940

2,226,597

UNITED STATES PATENT OFFICE 2,226,597

REFLECTOR STRUCTURE

William H. Thomas, Little Falls, N. Y.

Application September 17, 1938, Serial No. 230,485

1 Claim. (Cl. 88—81)

My invention relates generally to light reflecting structure, particularly for use on vehicles, and particularly to structure of this character involving link-like construction with the links bearing the light reflecting media, and an important object of my invention is to provide light reflecting structure of the character indicated which is readily conformable to outline automobile or other vehicular parts, or to outline designs and figures, for the purpose of producing warnings or information by means of reflected light.

Other important objects and advantages of my invention will be apparent from a reading of the following description taken in connection with the drawings, wherein for purposes of illustration I have set forth preferred embodiments of my invention.

In the drawings:

Figure 1 is a front elevational view of an automobile headlamp showing an adaptation of the invention involving a "chain" of reflector links distributed around the circumference of the lens of the headlamp.

Figure 2 is a side elevational view of Figure 1.

Figure 3 is a plan view of a portion of a "chain" of link-like reflector elements in accordance with the present invention and showing the "chain" in unconformed condition.

Figure 4 is an edge elevational view of Figure 3.

Figure 5 is an enlarged edge elevational view of one of the link-like elements.

Figure 6 is a perspective view of one of the mounting brackets for headlamp installation.

Figure 7 is an edge elevational view of another form of "chain" in accordance with the present invention.

Figure 8 is an enlarged transverse vertical sectional view taken through one of the reflector elements thereof.

Figures 9, 10 and 11 are respectively, plan views of alternative forms of link-like reflector elements.

Referring in detail to the drawings, the numeral 5 generally designates a plurality of interconnected link-like reflecting elements 6 forming a "chain." For purposes of illustration, this chain is shown as conformed to the outline of the front or lens containing portion of an automobile headlamp 7, the lens rim 8 thereof being shown as having riveted or otherwise secured thereto as indicated by the numeral 9 the flange 10 of the mounting bracket which is generally designated 11 and which comprises also the flange 12 which has fastening means 13 securing the "chain" 5 thereto. In practice preferably three circumferentially spaced brackets 11 will be employed as indicated in dotted lines in Figure 1 for properly and securely mounting the "chain" 5 to outline the headlamp lens 14 so that should the light source in the headlamp fail, the beams of oncoming headlights will illuminate the "chain" and serve to indicate the presence and location of the inoperative headlamp and thereby render the approach of vehicles traveling in opposite direction at night safer.

The "chain" 5 which is composed of the links 6 is made up of a suitable number of the links of suitable length and width, each link assuming the stepped form illustrated in Figure 5 and being formed of elongated slightly bowed plate material and being rounded at the opposite ends as indicated by the numerals 15, 16. Bolts or rivets 17, 18 traverse the overlapped straight ends and stepped ends of the respective links as clearly indicated in Figure 4 of the drawings so as to uniformly and swingably connect the links together. On the main plate portion 19 as contrasted with the stepped portion 20 is mounted the reflector jewel 21 which may be of the form shown in Figure 3 or of the form shown in Figures 7 and 8. In the form shown in Figure 3 of the drawings the jewel comprises the glass or other suitable material jewel per se 22 which is secured in the mounting 23 which comprises a cylindrical cup 24 having ears 25, 26 projecting from diametrically opposite sides thereof and disposed along the longitudinal axis of the links and secured in place by means of bolts or rivets or other suitable securing means 27.

The alternate form of reflector jewel shown in Figures 7 and 8 and generally designated 21a comprises the jewel per se 22a which is set in a cup 24a which has edge portions 28 turned over to hold the jewel 22a in place on the bottom of the cup and from the bottom of the cup projects a shank 29 which passes through a single hole in the link plate and the portion projecting on the opposite side of the plate is riveted as indicated by the numeral 30.

The links shown in Figures 9, 10 and 11 are similar in construction to the link shown in Figure 7 but differ therefrom in shape, that of Figure 9 being substantially circular with a single jewel, that of Figure 10 being diamond-shaped with a single jewel, and that of Figure 11 being diamond-shaped with three longitudinally aligned jewels.

Referring to Figure 7 of the drawings, the

"chain" 5a of this embodiment is formed from link-like elements 6a which comprise flat plate bodies 19a without a step and otherwise assuming generally the form of the link elements already described and being connected at the opposite ends with adjacent links 6a by means of rivets or bolts 17a and 18a.

Although I have shown and described herein preferred embodiments of my invention, it is to be definitely understood that I do not desire to limit the application of the invention thereto, and any change or changes may be made in the materials and in the structure and arrangement of the parts, within the spirit of the invention and the scope of the subjoined claim.

Having described the invention, what is claimed as new is:

A light reflecting device comprising a chain composed of at least three links, each link consisting of a substantially plain flat plate bent at one end to provide a substantially parallel offset, the adjoining plates being arranged with the offsets overlapping the unbent ends, pivotal securing means connecting the overlapped unbent and offset ends for relative swinging movement, reflecting jewels secured on the same side of the plates as the offsets, the offsets on connected ones of said plates acting as abutments in protective relation to the opposite ends of the reflecting jewel located therebetween, the opposite sides of the plates presenting a substantially uniform flat surface for engagement with a support, said reflecting jewel comprising an elongated mounting arranged longitudinally on the link within the side edges of the link and between the longitudinally inward end of the offset and the opposite end of the link, a light reflecting element on said mounting intermediate the ends thereof, and means traversing the opposite ends of said mounting and secured to the link.

WILLIAM H. THOMAS.